(12) United States Patent
Kasztelan

(10) Patent No.: US 6,316,382 B1
(45) Date of Patent: Nov. 13, 2001

(54) PROCESS FOR SULPHURIZING CATALYSTS BY REDUCTION FOLLOWED BY SULPHURIZATION

(75) Inventor: Slavik Kasztelan, Rueil Malmaison (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 0 days.

(21) Appl. No.: 09/344,346

(22) Filed: Jun. 25, 1999

(30) Foreign Application Priority Data

Jun. 25, 1998 (FR) .................................................. 98 08046

(51) Int. Cl.[7] .............................. B01J 27/02; B01J 27/04; B01J 27/043; B01J 27/045; B01J 27/047

(52) U.S. Cl. ........................ 502/216; 502/217; 502/219; 502/220; 502/221; 502/222; 502/223; 502/208; 502/210; 502/211; 502/202; 502/203; 502/204; 502/206; 502/207

(58) Field of Search .................................. 502/216, 217, 502/219, 220, 221, 222, 223, 208, 210, 211, 202, 203, 204, 206, 207

(56) References Cited

U.S. PATENT DOCUMENTS

| 3,893,947 | * | 7/1975 | Young ................................... 502/216 |
| 4,548,920 | * | 10/1985 | Thompson et al. ................... 502/219 |
| 5,206,202 | * | 4/1993 | Lachman et al. ..................... 502/216 |
| 5,338,717 | * | 8/1994 | Aldridge et al. ...................... 502/211 |
| 5,821,191 | * | 10/1998 | Lockemeyer .......................... 502/216 |
| 5,856,609 | * | 1/1999 | Wu et al. .............................. 502/216 |
| 6,100,216 | * | 8/2000 | Dufresne et al. ..................... 502/219 |

\* cited by examiner

*Primary Examiner*—Elizabeth D. Wood
(74) *Attorney, Agent, or Firm*—Millen, White, Zelano & Branigan, P.C.

(57) ABSTRACT

The invention concerns a process for sulphurizing supported catalysts containing at least one element selected from group IIIB, including the lanthanides and actinides, group IVB, group VB and group VIB, said process being characterized in that said catalyst is pre-reduced with at least one reducing gas other than hydrogen before sulphurizing said catalyst. The invention also concerns the sulfide catalysts obtained by the process of the present invention as well as the use of the sulfide catalyst in a process for hydrocracking and hydrotreatment of hydrocarbon-containing feeds.

17 Claims, No Drawings

PROCESS FOR SULPHURIZING CATALYSTS BY REDUCTION FOLLOWED BY SULPHURIZATION

The present invention relates to a process for the sulfurization of supported hydrocracking or hydroconversion catalysts containing at least one element selected from group IIB, including the lanthanides and actinides, group IVB, group VB and group VIB (groups 3, 4, 5 and 6 in the new notation for the periodic table: "Handbook of Chemistry and Physics, 76$^{th}$ edition, 1995–1996, inside front cover), associated with at least one porous matrix, generally an amorphous or low crystallinity oxide type matrix, optionally at least one zeolitic or non zeolitic molecular sieve, optionally at least one element selected from group VIII (groups 8, 9, 10 in the new notation for the periodic table), optionally at least one element selected from the group formed by P, B, Si, and optionally at least one element from group VIIA (group 17). The process for preparing the sulphurised catalyst is characterized in that the a prior reduction step is carried out using at least one reducing gas other than hydrogen before carrying out a sulphurisation step using any method which is known to the skilled person.

The present invention also relates to the catalysts obtained using the process of the present invention.

The present invention also relates to the use of the sulphide catalysts obtained as catalysts for hydrorefining or hydroconversion of hydrocarbon-containing feeds containing at least one aromatic and/or olefinic and/or naphthenic and/or paraffinic type compound, said feeds possibly containing metals and/or nitrogen and/or oxygen and/or sulphur.

The sulphides can be synthesised by a number of methods which are well known to the skilled person.

Crystallised transition metal or rare earth sulphides can be synthesised by reacting transition metal or rare earth type elements with elemental sulphur at high temperature in a process which its well known to the skilled person in the solid state chemistry field but is expensive, in particular as regards industrial application.

The synthesis of bulk or supported sulphides by reacting a suitable precursor in the form of a mixed oxide of transition metals or rare earth metals with a sulphur compound in a gas phase such as hydrogen sulphide or carbon disulphide, $CS_2$, or mercaptans, sulphides, disulphides, hydrocarbon-containing polysulphides, sulphur vapour, COS, carbon disulphide, in a traversed bed reactor, is well known to the skilled person.

The synthesis of sulphides by reacting a suitable precursor in the form of a mixed oxide of transition metals and/or rare earths impregnated with a sulphur compound in the liquid phase followed by treatment in hydrogen in a traversed bed reactor is well known to the skilled person.

The synthesis of bulk sulphide catalysts or sulphide catalysts supported on a porous matrix by treatment of a bulk oxide precursor or an oxide precursor supported on a porous matrix in hydrogen with a sulphur-containing hydrocarbon feed, in particular sulphur-containing petroleum cuts such as gasoline, kerosene, gas oil, to which a sulphur compound, for example dimethyldisulphide, can optionally be added, is also well known to the skilled person.

Bulk sulphides can also be synthesised by co-precipitation, in a basic medium, of sulphur-containing complexes in solution containing two cations. This method can be carried out at a controlled pH and is termed homogeneous sulphide precipitation. It has been used to prepare a mixed sulphide of cobalt and molybdenum (G. Hagenbach, P. Courty, B. Delmon, Journal of Catalysis, volume 31, page 264, 1973).

Synthesising bulk mixed sulphides on a porous matrix by treatment of a bulk oxide precursor or an oxide precursor supported on a porous matrix in a hydrogen/hydrogen sulphide mixture or nitrogen/hydrogen sulphide mixture is also well known to the skilled person.

United States patent U.S. Pat. No. 4,491,639 describes the preparation of a sulphur-containing compound by reacting elemental sulphur with V, Mo and W salts and in particular V, Mo and W sulphides optionally containing at least one of elements from the series C, Si, B, Ce, Th, Nb, Zr, Ta and U in combination with Co or Ni.

Other methods have been proposed for the synthesis of simple sulphides. As an example, the synthesis of crystallised simple sulphides of rare earths described in U.S. Pat. No. 3,748,095 and French patent FR-A-2 100 551 proceeds by reacting hydrogen sulphide or carbon disulphide with an amorphous rare earth oxide or oxycarbonate at a temperature of over 1000° C.

European patents EP-A-0 440 516 and U.S. Pat. No. 5,279,801 describe a process for synthesizing simple transition metal or rare earth sulphur-containing compounds by reacting a transition metal or rare earth compound with a carbon-containing sulphur compound in the gaseous state, in a closed vessel at a moderate temperature of 350° C. to 600° C.

However, it is well known that certain elements such as group IIIB elements, including the lanthanides and actinides, group IVB elements, and group VB elements, in a bulk oxide form are very difficult to sulphurise. The known sulphurisation methods which are routinely used industrially and in the laboratory, such as sulphurisation in a gaseous hydrogen/hydrogen sulphide mixture or liquid phase sulphurisation under hydrogen pressure using a mixture of a hydrocarbon feed and a sulphur-containing compound such as dimethyldisulphide, are thus ineffective when sulphurising such solids.

The considerable amount of research carried out by the Applicant on preparing sulphide catalysts based on sulphides of elements from groups IIIB, IVB and VB and numerous other elements of the periodic table, used alone or as mixtures, associated with a matrix, have led to the discovery that, surprisingly, if a treatment in a reducing gas other than hydrogen is carried out prior to sulphurisation, the activity of the catalysts is improved. Without wishing to be bound by any particular theory, it appears that sulphurisation of a catalyst which has been moderately pre-reduced by a reducing gas other than hydrogen results in better sulphurisation and better dispersion of the sulphide phase.

The invention relates to preparing sulphide catalysts, characterized in that a prior reduction step is carried out using at least one reducing gas other than hydrogen before carrying out the sulphurisation step.

More precisely, a process for producing the sulphide catalysts of the present invention comprises the following steps:

a) preparing a catalyst which comprises at least one element selected from group IIIB, including the lanthanides and actinides, group IVB, group VB and group VIB, at least one porous matrix which is generally an amorphous or low crystallinity oxide type matrix, optionally associated with at least one zeolitic or non zeolitic molecular sieve, optionally at least one group VIII element, optionally at least one element selected from the group formed by P, B and Si, optionally at least one anion from group VIIA, optionally carbon, and optionally water;

b) carrying out a reducing treatment on the catalyst prepared in step a) by exposing it to a gas or a mixture of reducing gases other than hydrogen in a reactor at a heating temperature of more than 40° C. at a pressure of over 0.01 MPa;

c) sulphurising the catalyst by exposing the reduced catalyst obtained in step b) to a solid, liquid or gaseous sulphurising agent at a temperature in the range 40° C. to 1000° C. and at a pressure of over 0.01 MPa.

The reactor may be a closed reactor. In this case, it may be charged in the open air and after sealing, it may be purged with an inert gas such as argon or helium and the reducing gas is introduced. After reaction, the pressure exerted is the pressure due to the gases produced by the reactions and to the residual reducing gas.

The reactor can be a traversed bed reactor, such as a fixed bed, moving bed, ebullated bed, or fluidised bed reactor. In this case the pressure exerted is that of the reducing gas.

Catalyst sulphurisation can also be carried out ex-situ, for example outside the location where the catalyst is used.

The reaction of step b) is carried out in an atmosphere of at least one reducing gas other than hydrogen. The reducing gas can be one of the following gases, used alone or diluted in an inert gas: carbon monoxide CO, carbon dioxide $CO_2$, nitric oxide NO, $NO_2O$, $NO_2$, a $C_nH_{2n+2}$ saturated hydrocarbon where n=1 to 10, in particular methane, ethane, propane, butane, a $C_nH_{2n}$ saturated cyclic hydrocarbon where n=3 to 6, or ammonia. These gases can optionally be diluted by an inert gas such as nitrogen, a rare gas such as helium, neon, argon, krypton, xenon or radon, superheated steam or a combination of at least two of these compounds.

Sulphurisation step c) can be carried out using any method which is known to the skilled person, in particular the methods cited above. Preferably, the method consisting of exposing the precursor to a gaseous mixture of hydrogen sulphide in hydrogen at a temperature in the range 20° C. to 800° C., preferably 40° C. to 600° C., at a pressure of over 0.001 MPa is used, or the method consisting of exposing the catalyst to a liquid hydrocarbon-containing feed containing sulphur, either naturally present in the feed or obtained by adding an organic sulphur compound such as dimethyl disulphide to the hydrocarbon-containing feed.

The invention also relates to the sulphide catalysts obtained using the process of the present invention, generally comprising at least one metal selected from the following groups and in the following amounts, generally in % by weight with respect to the total catalyst mass:

0.01% to 40%, preferably 0.01% to 35%, more preferably 0.01% to 30%, of at least one metal selected from elements from groups IIIB, IVB, VB and VIB;

0.1% to 99%, preferably 1% to 98%, of at least one support selected from the group formed by amorphous matrices and low crystallinity matrices;

0.001% to 30%, preferably 0.01% to 55%, of sulphur;

0 to 30%, preferably 0.01% to 25%, of at least one group VIII metal; and optionally 0 to 90%, preferably 0.1% to 85%, more preferably 0.1% to 80%, of a zeolitic or non zeolitic molecular sieve;

0 to 40%, preferably 0.1% to 30%, more preferably 0.1% to 20%, of at least one element selected from the group formed by boron, silicon and phosphorous;

0 to 20%, preferably 0.1% to 15%, more preferably 0.1% to 10%, of at least one element selected from group VIIA.

The group VB elements are selected from vanadium, niobium and thallium; the group IVB elements are selected from titanium, zirconium and hafnium, preferably titanium. The group IIIB elements are selected from yttrium, lanthanum, cerium, praseodymium, neodymium, samarium, europium, gadolinium, terbium, dysprosium, holmium, erbium, thulium, ytterbium, lutetium, actinium, thorium and uranium. The group VIII elements are selected from iron, cobalt, nickel, ruthenium, rhodium, palladium, osmium, iridium and platinum, preferably iron, cobalt and nickel. The group VIB elements are selected from chromium, molybdenum and tungsten.

Compounds containing at least one element with an atomic number included in the group constituted by elements from group IIIB, including the lanthanides and actinides, group IVB and group VB, and groups VIB and VIII, include oxides, hydroxides, oxyhydroxides, acids, polyoxometallates, alkoxides, oxalates, ammonium salts, nitrates, carbonates, hydroxycarbonates, carboxylates, halides, oxyhalides, phosphates, hydrides and thiosalts, in particular of ammonium. Preferably, oxides and salts of transition metals, lanthanides and actinides are used.

All of the forms of the carbon source which are known to the skilled person can be used, for example graphite, oil coke, coal coke, amorphous carbon, carbon black, charcoals obtained by partial combustion or by decomposition or by dehydrogenation of vegetable compounds or animal compounds or hydrocarbons, various petroleum cuts, vegetable hydrocarbons such as vegetable oils, etc. . . . The carbon source generally contains hydrogen and one of its characteristics is its H/C atomic ratio. Preferably, a carbon source with an H/C ratio of less than 2, more preferably an H/C ratio of less than 1.7, and still more preferably an H/C ratio of less than 1.4 is used.

The preferred phosphorous source is orthophosphoric acid $H_3PO_4$, but its salts and esters such as alkaline phosphates and ammonium phosphates are also suitable. Phosphorous can, for example, be introduced in the form of a mixture of phosphoric acid and a basic organic compound containing nitrogen such as ammonia, primary and secondary amines, cyclic amines, compounds of the pyridine family and quinolines and compounds from the pyrrole family.

A number of silicon sources can be used. Thus the following can be used a hydrogel, an aerogel or a colloidal suspension of an oxide of silicon, precipitation oxides, oxides from the hydrolysis of esters such as ethyl orthosilicate $Si(OEt)_4$, silanes and polysilanes, siloxanes, polysiloxanes, silicates of halides such as ammonium fluorosilicate $(NH_4)_2SiF_6$ or sodium fluorosilicate $Na_2SiF_6$. Silicon can be added, for example, by impregnating with ethyl silicate in solution in an alcohol.

The boron source can be an amorphous borate such as ammonium biborate or ammonium pentaborate. Boron can, for example, be introduced in the form of a solution of boric acid in an alcohol.

Sources of group VIIA elements which can be used are well known to the skilled person. As an example, fluoride ions can be introduced in the form of hydrofluoric acid or its salts. These salts are formed with alkaline metals, ammonium salts or salts of an organic compound. In the latter case, the salt is advantageously formed in the reaction mixture by reaction between the organic compound and hydrofluoric acid. Hydrolysable compounds which can liberate fluoride ions in water can also be used, such as ammonium fluorosilicate $(NH_4)_2SiF_6$, silicon tetrafluoride $SiF_4$ or sodium fluorosilicate $Na_2SiF_6$. Fluorine can be introduced, for example, by impregnating with an aqueous solution of hydrofluoric acid or ammonium fluoride.

The chloride anions can be introduced in the form of hydrochloric acid or its salts. These salts are formed with alkali metals, ammonium or an organic compound. In the latter case, the salt is advantageously formed in the reaction mixture by reaction between the organic compound and hydrochloric acid.

The normally amorphous or low crystallinity porous mineral matrix is generally selected from the group formed by alumina, silica, silica-alumina, or a mixture of at least two of the oxides cited above. Preferably, matrices containing alumina are used, in all of its forms which are known to the skilled person, for example gamma alumina.

The catalyst can also comprise at least one compound selected from the group formed by molecular sieves of the crystalline aluminosilicate type or natural or synthetic zeolites such as Y, X, L zeolite, beta zeolite, mordenite, omega zeolites, NU-10, TON, ZSM-22, ZSM-5.

The first step of the process of the invention consists of preparing a catalyst precursor containing one or more compounds comprising at least one element with an atomic number which is in the group constituted by group IIIB, including the lanthanides and actinides, group IVB, group VB, the porous matrix, group VIB and optionally at least one group VIII element, optionally at least one element selected from P, B and Si, and optionally at least one anion from group VIIA. This first step can be accomplished in several stages.

The matrix can first be formed and calcined before introduction into the mixture. Forming can be by extrusion, pelletisation, the oil-drop method, rotating plate granulation or any other method which is known to the skilled person. The pre-formed matrix is optionally calcined in air, usually at a temperature of at least 100° C., routinely at about 200° C. to 1000° C.

The matrix can be pre-impregnated with the transition metal or rare earth salt, or a salt containing the element selected from P, B and Si or an anion from group VIIA. For example, molybdenum impregnation can be facilitated by introducing phosphoric acid into the solutions, which enables phosphorous to be introduced as well to improve the catalytic activity. Other phosphorous compounds can be used, as is well known to the skilled person.

The matrix is preferably impregnated using the "dry" impregnating method which is well known to the skilled person.

Impregnation can be carried out in a single step using a solution containing all of the constituent elements of the final catalyst.

The elements selected from group IIIB, including the lanthanides and actinides, group IVB, group VB, optional group VIB, group VIII, the element selected from the group formed by P, B and Si, and the element selected from group VIIA anions, can be introduced by one or more ion exchange operations carried out on the selected matrix, using a solution containing at least one precursor of the transition metal or rare earth metal.

When the metals are introduced in a plurality of steps for impregnating the corresponding precursor salts, an intermediate step for drying the catalyst must be carried out at a temperature in the range 60° C. to 250° C.

The mixture of powders containing all or part of the ingredients can be formed, for example by extrusion, pelletisation, the oil drop method, rotating plate granulation or any other method which is well known to the skilled person.

The sulphide catalysts obtained in the present invention are used as catalysts for hydrogenation, hydrodenitrogenation, hydrodeoxygenation or hydrodesulphurisation of feeds containing aromatic and/or olefinic and/or naphthenic and/or paraffinic compounds, said feeds optionally containing metals and/or nitrogen and/or oxygen and/or sulphur. In these applications, the catalysts obtained by the present invention have an improved activity over the prior art.

The feeds used are gasolines, gas oils, vacuum gas oils, deasphalted or non deasphalted residues, paraffin oils, waxes and paraffins. They may contain heteroatoms such as sulphur, oxygen and nitrogen, and metals. The reaction temperature is in general over 200° C. and usually in the range 280° C. to 480° C. The pressure is over 0.1 MPa and in general over 5 MPa. The hydrogen recycle ratio is a minimum of 80, usually in the range 200 to 4000 litres of hydrogen per litre of feed. The hourly space velocity is generally in the range 0.1 to 20 $h^{-1}$.

The refiner is interested in the HDS, HDN and conversion activity. Fixed objectives have to be achieved under conditions which are compatible with economic reality. Thus the refiner seeks to reduce the temperature, the pressure, and the hydrogen recycle ratio and to maximise the hourly space velocity. The activity is known to be increased by increasing the temperature, but this is often to the detriment of catalyst stability. The stability or service life increases with increased pressure or hydrogen recycle ratio, but this is to the detriment of the economics of the process.

The following examples illustrate the invention without in any way limiting its scope.

EXAMPLE 1

Preparation of an Alumina Support Used in the Catalyst Composition

An alumina based support was produced to enable the catalysts described below to be prepared from the formed support. To this end, a matrix composed of ultrafine tabular boehmite or alumina gel sold by Condéa Chemie GmbH under the trade name SB3 was used. This gel was mixed with an aqueous solution containing 66% nitric acid (7% by weight of acid per gram of dry gel), then mixed for 15 minutes. After mixing, the paste obtained was passed through a die with cylindrical orifices with a diameter of 1.3 mm. The extrudates were then dried overnight at 120° C. and calcined at 550° C. for 2 hours in moist air containing 7.5% by volume of water. Cylindrical extrudates 1.2 mm in diameter were obtained which had a specific surface area of 243 $m^2/g$, a pore volume of 0.61 $cm^3/g$ and a monomodal pore distribution centred on 10 nm. X ray diffraction analysis of the matrix revealed that it was uniquely composed of low crystallinity cubic gamma alumina.

EXAMPLE 2

Preparation of a Mo/alumina Hydrotreatment Catalyst

The extruded alumina support of Example 1 was dry impregnated using an aqueous solution comprising a molybdenum salt. The molybdenum salt was ammonium heptamolybdate $Mo_7O_{24}(NH_4)_6 \cdot 4H_2O$. After ageing at room temperature in a water-saturated atmosphere, the impregnated extrudates were dried overnight at 120° C. then calcined at 550° C. for 2 hours in dry air. The final molybdenum trioxide content was 14.5% by weight.

EXAMPLE 3

Preparation of a CoMo/alumina Hydrotreatment Catalyst

The extruded alumina support of Example 1 was dry impregnated using an aqueous solution comprising molybdenum and cobalt salts. The molybdenum salt was ammonium heptamolybdate $Mo_7O_{24}(NH_4)_6.4H_2O$ and the cobalt salt was cobalt nitrate $Co(NO_3)_2.6H_2O$. After ageing at room temperature in a water-saturated atmosphere, the impregnated extrudates were dried overnight at 120° C. then calcined at 550° C. for 2 hours in dry air. The final molybdenum trioxide content was 14.5% by weight. The final cobalt oxide content was 2.8% by weight. The catalyst obtained was representative of industrial catalysts.

EXAMPLE 4

Preparation of a Nb/alumina Hydrotreatment Catalyst

Niobium was added to the extruded alumina support of Example 1 by dry impregnation of a solution of niobium pentoxide $Nb(OEt)_5$ in ethanol. After dry impregnation, the extrudates were dried overnight at 80° C. The Nb/alumina catalyst obtained had a final diniobium pentoxide content of 13.1% by weight.

EXAMPLE 5

Preparation of a CoNb/alumina Hydrotreatment Catalyst

Cobalt was added to the Nb/alumina catalyst of Example 4 by dry impregnation using a solution of cobalt nitrate $Co(NO_3)_2.6H_2O$ so as to obtain a final cobalt oxide CoO content of 2.9% by weight.

After dry impregnation, the extrudates were dried overnight at 80° C. The CoNb/alumina catalyst obtained contained 12.7% by weight of $Nb_2O_5$ and 2.8% by weight of CoO.

EXAMPLE 6

Preparation of a Ce/alumina Hydrotreatment Catalyst

Cerium was added to the extruded alumina support of Example 1 by dry impregnation using a solution of cerium nitrate $Ce(NO_3)_4.xH_2O$. After dry impregnation, the extrudates were dried overnight at 80° C. and calcined at 350° C. for 2 hours in dry air. The Ce/alumina catalyst obtained had a final $CeO_2$ content of 5.1% by weight.

EXAMPLE 7

Preparation of a CoCe/alumina Hydrotreatment Catalyst

The catalyst of Example 6 was dry impregnated using an aqueous solution of cobalt nitrate $Co(NO_3)_2.6H_2O$. After ageing at room temperature in a water-saturated atmosphere, the impregnated extrudates were dried overnight at 80° C. then calcined at 350° C. for 2 hours in dry air. The final cerium oxide content was 14.5% by weight. The final cobalt oxide content was 2.0% by weight.

EXAMPLE 8

Catalyst Reduction R1 (In Accordance With The Invention)

50 g of freshly dried catalyst was introduced into a fixed bed reactor flushed with a stream of nitrogen at atmospheric pressure. The temperature was raised to 300° C. then 1% of carbon monoxide in nitrogen was injected and the catalyst was heated to a temperature of 400° C. and maintained at that temperature for 10 hours. 2 litres per hour of gaseous mixture was passed per 50 g of solid. A catalyst was obtained which had been reduced by method R1. Each catalyst of Examples 2 to 7 was then reduced using method R1.

EXAMPLE 9

Catalyst Reduction R2 (In Accordance With The Invention)

50 g of freshly dried catalyst was introduced into a fixed bed reactor flushed with a stream of nitrogen at atmospheric pressure. The temperature was raised to 300° C. then 1% of nitric oxide NO in nitrogen was injected and the temperature was increased to 400° C. and maintained at that temperature for 10 hours. 2 litres per hour of gaseous mixture was passed per 50 g of solid. A catalyst was obtained which had been reduced by method R2. Each catalyst of Examples 2 to 7 was then reduced using method R2.

EXAMPLE 10

Catalyst Sulphurisation 50 g of freshly dried catalyst or catalyst reduced by method R1 or catalyst reduced by method R2 was introduced into a fixed bed reactor flushed with a stream of gas containing 15% by volume of $H_2S$ in hydrogen at atmospheric pressure. 2 litres per hour of gaseous mixture was passed per 50 g of solid and the catalyst was heated to a temperature of 400° C. and maintained at that temperature for 10 hours.

Sulphurisation of freshly dried catalysts produced catalysts sulphurised by $H_2S$ with the degrees of sulphurisation and carbon contents which are shown in Table 1. The Table shows that the method of sulphurisation using an $H_2/H_2S$ mixture could produce a satisfactory degree of sulphurisation for the CoMo/alumina catalyst, but in contrast the degrees of sulphurisation for the catalysts containing the group VB metal, niobium, or the lanthanide group metal, cerium, were very low.

TABLE 1

| Catalyst | S content after sulphurisation (wt %) | C content after sulphurisation (wt %) | Degree of sulphurisation (%) |
| --- | --- | --- | --- |
| Mo | 5.30 | <0.05 | 89 |
| CoMo | 6.6 | <0.05 | 93 |
| Nb | 0.85 | <0.05 | 14 |
| CoNb | 1.06 | <0.05 | 16 |
| Ce | 0.20 | <0.05 | 10 |
| CoCe | 0.45 | <0.05 | 17 |

Sufphurisation of catalysts reduced by method R1 produced catalysts with the degree of sulphurisation and residual carbon content shown in Table 2. It can be seen from this Table that the sulphurisation method using an $H_2/H_2S$ mixture after reducing the catalysts by method R1 produced a highly satisfactory degree of sulphurisation for the CoMo/alumina catalyst, and for the catalysts containing the group VB metal, niobium. The degree of sulphurisation of the lanthanide group metal, cerium, was considerably improved over sulphurisation without prior reduction. It should be noted that using CO led to a deposit of small quantities of carbon on the catalyst.

TABLE 2

| Catalyst | S content after sulphurisation (wt %) | C content after sulphurisation (wt %) | Degree of sulphurisation (%) |
|---|---|---|---|
| Mo | 5.61 | 1.13 | 94 |
| CoMo | 6.80 | 0.95 | 96 |
| Nb | 3.56 | 1.20 | 60 |
| CoNb | 4.27 | 1.13 | 63 |
| Ce | 0.85 | 1.60 | 46 |
| CoCe | 1.11 | 1.45 | 43 |

Sulphurisation of catalysts reduced by method R2 produced catalysts with the degree of sulphurisation and a residual carbon content shown in Table 3. It can be seen from this Table that the sulphurisation method using an $H_2/H_2S$ mixture after reducing the catalysts by method R2 produced a highly satisfactory degree of sulphurisation for the CoMo/alumina catalyst, and for the catalysts containing the group VB metal, niobium. The degree of sulphurisation of the lanthanide group metal, cerium, was considerably improved over sulphurisation without prior reduction.

TABLE 3

| Catalyst | S content after sulphurisation (wt %) | C content after sulphurisation (wt %) | Degree of sulphurisation (%) |
|---|---|---|---|
| Mo | 5.6 | <0.05 | 92 |
| CoMo | 6.8 | <0.05 | 96 |
| Nb | 3.8 | <0.05 | 64 |
| CoNb | 3.9 | <0.05 | 58 |
| Ce | 0.68 | <0.05 | 37 |
| CoCe | 1.18 | <0.05 | 46 |

EXAMPLE 11

Catalyst Gas Oil HDS Test

The catalysts sulphurised using the methods of Example 8 were compared in a gas oil hydrodesulphurisation test.

The principal characteristics of the gas oil are shown in the following table:

| | |
|---|---|
| Density at 15° C. | 0.856 |
| Refractive index at 20° C. | 1.4564 |
| Viscosity at 50° C. | 3.72 cSt |
| Sulphur | 1.57% by weight |
| Simulated distillation | |
| IP | 153° C. |
| 5% | 222° C. |
| 50% | 315° C. |
| 95% | 415° C. |
| EP | 448° C. |

The gas oil HDS test was carried out under the following operating conditions:

| | |
|---|---|
| Total pressure | 3 MPa |
| Catalyst volume | 40 cm³ |
| Temperature | 340° C. |
| Hydrogen flow rate | 20 l/h |
| Feed flow rate | 80 cm³/h |

For these tests, the catalysts which had been sulphurised using the methods of Example 8, and thus pre-reduced, were charged into the catalytic reactor then wetted by the feed at a temperature of 150° C. The temperature of the unit was then raised to 340° C.

A reference test was carried out for each catalyst by charging the CoMo catalyst of Example 2 into the catalytic test unit and carrying out a sulphurisation step by passing the test feed defined above, to which 2% by weight of dimethyldisulphide (DMDS) had been added, under the test conditions shown in the above Table, except that the temperature was 350° C., said temperature being maintained for 10 hours. After this step, the temperature was reduced to the test temperature, 340° C., and pure feed was injected. This sulphurisation method was termed A-DMDS.

The catalytic performances of the tested catalysts are shown in Table 4. They are expressed as the activity, with an order of 1.5. The relationship connecting activity and conversion (%HDS) is as follows:

Activity=$[100/(100-\%HDS)]^{0.5}-1$

To compare the activities of the Mo and CoMo catalysts, in Table 4, the activity of the Mo catalyst sulphurised by DMDS, A-DMDS, was assumed to be equal to 1.

TABLE 4

Activity of Mo/alumina catalysts for gas oil hydrodesulphurisation
Relative catalyst activity

| Sulphurisation | Mo | CoMo |
|---|---|---|
| DMDS | 1 | 6.2 |
| H2S | 0.9 | 5.4 |
| R1-H2S | 1.15 | 7.2 |
| R2-H2S | 1.18 | 7.9 |

To compare the activities of the Nb catalysts, in Table 5, the activity of the monometallic Nb/alumina catalyst sulphurised by DMDS, A-DMDS, was assumed to be equal to 1.

TABLE 5

Activity of Nb/alumina catalysts for gas oil hydrodesulphurisation
Relative catalyst activity

| Sulphurisation | Nb | CoNb |
|---|---|---|
| DMDS | 1 | 1.5 |
| H2S | 1.05 | 1.5 |
| R1-H2S | 4.05 | 5.5 |
| R2-H2S | 5.21 | 6.8 |

To compare the activities of the Ce catalysts, in Table 6, the activity of the monometallic Ce/alumina catalyst sulphurised by DMDS, A-DMDS, was assumed to be equal to 1.

TABLE 6

Activity of Ce/alumina catalysts for gas oil hydrodesulphurisation
Relative catalyst activity

| Sulphurisation | Ce | CoCe |
|---|---|---|
| DMDS | 1 | 1.3 |
| H2S | 2.25 | 4.15 |
| R1-H2S | 3.85 | 7.34 |
| R2-H2S | 4.98 | 8.67 |

Tables 4, 5 and 6 show that the HDS performance of the catalysts sulphurised by the $H_2/H_2S$ mixture is inferior to the performance of the catalyst sulphurised by the mixture of gas oil and DMDS, which is the reference sulphurisation method.

It should be noted that the samples of catalyst reduced by carbon monoxide, R1-H2S, or nitric oxide, R2-H2S, prior to sulphurisation by the gaseous $H_2/H_2S$ mixture, were more active than the non reduced catalysts. This positive effect was weak in the case of molybdenum based catalysts. In contrast, it was substantially higher for the catalysts based on a group IIIB or VB element. This effect could be due to better dispersion of the sulphide phase formed and to better interaction of cobalt with the molybdenum, niobium or cerium sulphide due to partial reduction of the cobalt, molybdenum, niobium or cerium from the start of sulphurisation. The process for producing the sulphide catalyst of the present invention can thus produce sulphurised catalysts with improved catalytic properties.

What is claimed is:

1. In a process comprising sulphurising a catalyst containing at least one element selected from at least one of group IIIB, including the lanthanides and actinides, group IVB, group VB and group VIB, the improvement wherein said catalyst is pre-reduced by at least one reducing gas other than hydrogen before sulphurising said catalyst.

2. A process according to claim 1, in which the reducing gas is carbon monoxide, nitric oxide, $N_2O$, methane, ethane, propane, butane, a saturated cyclic hydrocarbon or ammonia, used alone or as a mixture, optionally diluted by an inert gas.

3. A process according to claim 1, in which the catalyst further comprises at least one group VIII metal.

4. A process according to claim 1, in which the catalyst comprises a porous amorphous or low crystallinity oxide matrix.

5. A process according to claim 1, in which the catalyst also comprises at least one zeolitic or non zeolitic molecular sieve.

6. A process according to claim 1, in which the catalyst also comprises at least one element selected from the group formed by P, B and Si.

7. A process according to claim 1, in which the catalyst also comprises at least one source of anions from group VIIA.

8. A process according to claim 1, characterized in that the following steps are carried out:
   a) preparing a catalyst which comprises at least one element selected from group IIIB, including the lanthanides and actinides, group IVB, group VB and group VIB, and optionally all element from group VIII at least one porous amorphous or low crystallinity oxide matrix, optionally associated with at least one zeolitic or non zeolitic molecular sieve, optionally at least one element selected from the group formed by P, B and Si, optionally at least one anion from group VIIA, optionally carbon, and optionally water;
   b) carrying out a reducing treatment on the catalyst prepared in step a) by exposing it to a gas or a mixture of reducing gases other than hydrogen in a reaction zone at a heating temperature of more than 40° C. at a pressure of over 0.01 MPa;
   c) sulphurising the catalyst by exposing the reduced catalyst obtained in step b) to a solid, liquid or gaseous sulphurising agent at a temperature in the range 40° C. to 1000° C. and at a pressure of over 0.01 MPa.

9. A process according to claim 1, in which the catalyst is sulphurised by exposing said catalyst to a gaseous mixture of hydrogen sulphide in hydrogen at a temperature in the range 20° C. to 800° C., at a pressure of over 0.01 MPa.

10. A process according to claim 1, in which the catalyst is sulphurised by exposing the catalyst to a hydrocarbon-containing feed containing sulphur.

11. A process according to claim 1, in which the catalyst is sulphurised ex-situ with respect to the location where said catalyst is used.

12. A process according to claim 1, in which the reaction zone is in a closed vessel with an autogenous pressure of the gases produced by the reduction and sulphurisation reactions.

13. A process according to claim 1, in which the reaction zone is in an open vessel.

14. A process according to claim 1, in which the matrix is first impregnated, in one or more steps, with the salt of a transition metal or rare earth metal, optionally a salt containing the element selected from P, B and Si, optionally the anion from group VIIA, and in which an intermediate drying step is carried out on the catalyst at a temperature in the range of 60° C. to 250° C. between each impregnation step.

15. A process according to claim 9, wherein the heating temperature is 40° C. to 600° C.

16. A process according to claim 3, in which the catalyst also comprises at least one element selected from the group formed by P, B and Si.

17. A process according to claim 16, in which the catalyst also comprises at least one source of anions from group VIIA.

* * * * *